United States Patent
Dennison, Jr.

[11] 4,374,379
[45] Feb. 15, 1983

[54] MOISTURE SENSING DEVICE FOR PIPES AND THE LIKE

[76] Inventor: Everett G. Dennison, Jr., 200 Glenview Rd., Canfield, Ohio 44406

[21] Appl. No.: 181,128

[22] Filed: Aug. 25, 1980

[51] Int. Cl.³ ............................................. G08B 21/00
[52] U.S. Cl. ...................................... 340/604; 73/49.1; 200/61.05; 340/605; 340/620
[58] Field of Search ............... 340/604, 602, 605, 620; 73/40, 40.5 R, 49.1; 200/61.04, 61.05, 61.06

[56] References Cited
U.S. PATENT DOCUMENTS 3,020,528  2/1962  Swanson, Jr. et al. .......... 340/604 X
3,677,085  7/1972  Hayakawa ......................... 73/204
3,732,556  5/1973  Caprillo et al. ............... 73/304 R X

*Primary Examiner*—John W. Caldwell, Sr.
*Assistant Examiner*—Daniel Myer

[57] ABSTRACT

A moisture sensing device for application to water pipes and the like utilizes a pair of closely spaced electrical conductors partially positioned in an elongated flexible insulating member which can be adhesively affixed to a water pipe or the like with the spaced partially exposed electrical conductors in oppositely disposed relation to the pipe. An alarm actuating circuit is connected with the spaced conductors and arranged to initiate an alarm when moisture bridges the closely spaced conductors.

4 Claims, 5 Drawing Figures

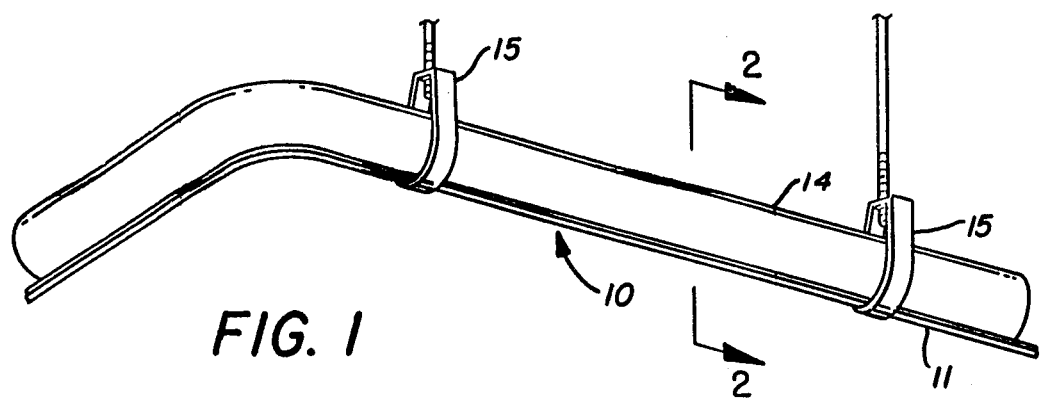
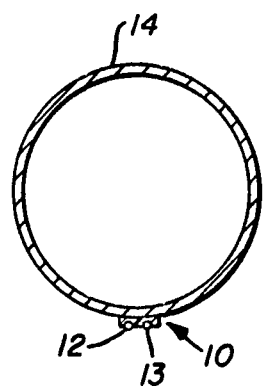
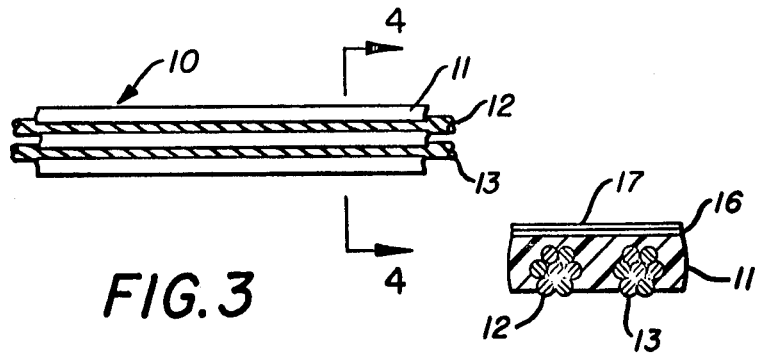
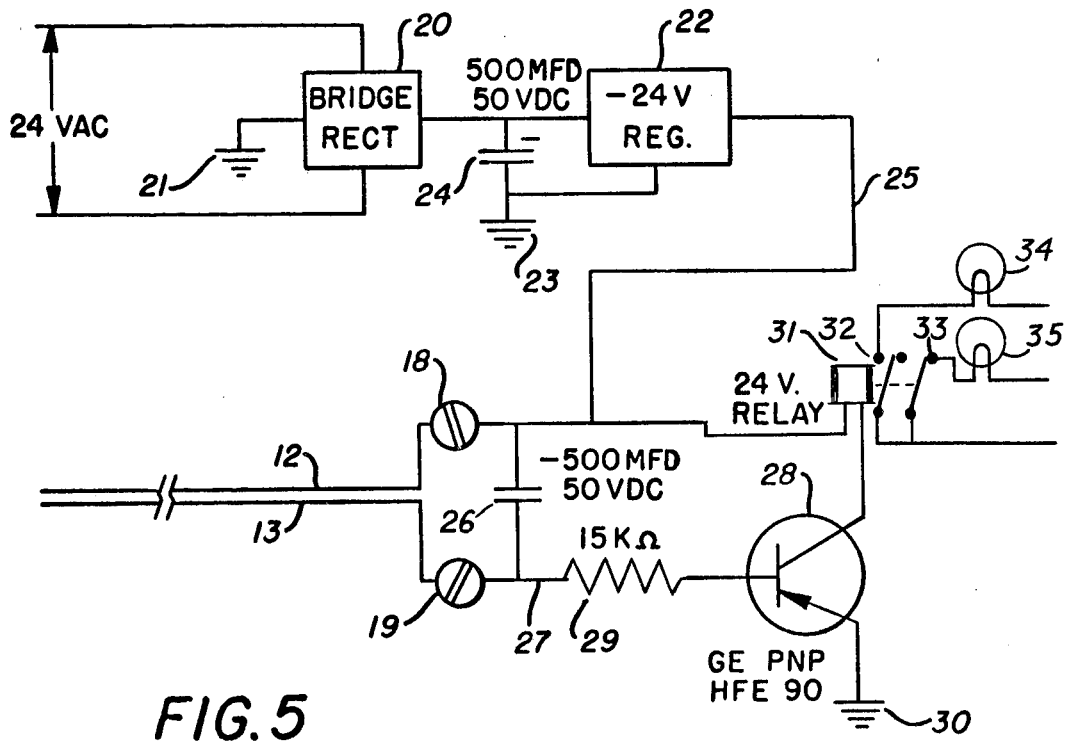

4,374,379

MOISTURE SENSING DEVICE FOR PIPES AND THE LIKE

BACKGROUND OF THE INVENTION (1) Field of the Invention

This invention relates to moisture sensing devices and circuits for the detection of water and other conductive fluids.

(2) Description of the Prior Art

Prior art devices incorporating moisture sensing elements are disclosed in U.S. Pat. Nos. 336,773, 3,732,556, 4,013,924 and 4,106,001.

In U.S. Pat. No. 336,773 conductors are separated by a material which will absorb water so as to bridge the conductors.

In U.S. Pat. No. 3,732,556 vertically spaced conductors are positioned around the edge of a swimming pool.

In U.S. Pat. No. 4,013,924 conductors are positioned in normally dry and electrically insulating hygroscopic material which forms an insulating layer on a steam pipe or the like. Moisture leaking from the pipe is contained by the hygroscopic material which then becomes a conductor.

In U.S. Pat. No. 4,106,001 a moisture detector for use with an undergarment discloses an adhesive strip having a pair of spaced conductors which can thereby be affixed to the undergarment.

In the present invention the arrangement of the closely spaced electrical conductors in the elongated flexible insulating member with only small areas of the conductors surface exposed, forms a novel and very inexpensive essential element in a moisture sensing device as the device of the invention can be easily adhesively affixed along the bottom of a pipe to be supervised.

SUMMARY OF THE INVENTION

A moisture sensing device for pipes and the like consists of a sensing element comprising an elongated flexible insulating member having a pair of closely spaced electrical conductors partially positioned therein with limited surface areas exposed, the elongated flexible insulating member is easily attached as by adhesives to a pipe to be supervised as by running the same along the bottom thereof with the exposed portions of the closely spaced conductors in oppositely disposed relation to the bottom surface of the pipe. The moisture sensing conductors are connected to a circuit consisting of a transistor, relay, and power supply. The conductors, in the presence of moisture, cause the transistor to draw current energizing a relay which in turn actuates normally open and normally closed switches controlling desirable alarm devices.

DESCRIPTION OF THE DRAWINGS

FIG. 1 is a perspective elevation of a portion of a water pipe showing the bottom thereof and the moisture sensing elements affixed thereto;

FIG. 2 is an enlarged cross section on line 2—2 of FIG. 1;

FIG. 3 is a greatly enlarged bottom elevation of the sensing element shown in FIG. 1;

FIG. 4 is a cross section thereof;

FIG. 5 is a block schematic diagram of an alarm actuating circuit in connection with the moisture sensing element of FIGS. 1–4.

DESCRIPTION OF THE PREFERRED EMBODIMENT

A moisture sensing device for pipes and the like disclosed herein consists essentially of a continuous strip water sensor 10 comprising a continuous elongated flexible insulating member 11 formed of a suitable synthetic resin such as polyvinyl chloride in which a pair of electrical conductors 12 and 13 comprising multi-strand copper are largely embedded.

In FIG. 1 of the drawings, the continuous strip water sensor generally indicated at 10 is shown affixed to the bottom of a water pipe 14 which in turn is suspended by pipe hangers 15 from an overhead support. The relative size of the pipe 14 and the continuous strip water sensor 10 may be seen in the cross section comprising FIG. 2 of the drawings.

By referring now to FIGS. 3 and 4 of the drawings, enlarged bottom and cross sectional views of the continuous strip water sensor 10 may be seen.

The continuous elongated flexible insulating member 11 having a width approximately one-eighth of an inch and a thickness slightly greater than 1/32nd of an inch in the preferred embodiment and as seen in FIGS. 3 and 4 of the drawings, the electrical conductors 12 and 13 are largely embedded in the flexible insulating member 11 so that only small areas of the conductors are exposed on the lower surface of the flexible insulated member 11 as best seen in FIG. 4 of the drawings. The electrical conductors 12 and 13 are spaced 3/64 of an inch.

The upper transverse surface of the continuous elongated flexible insulating member 11 is substantially flat and a layer of a suitable adhesive 16 is preferably formed thereon along with a protective plastic film cover 17. A suitable adhesive that is self-adhering with respect to plastics and metal and many other materials is available under the trademark SCOTCH as manufactured by 3M Company of Minneapolis, Minn.

Alternately, the continuous elongated flexible insulating member 10 may be coated with a similar adhesive in liquid form at the time the continuous strip water sensor is applied to the pipe.

As seen in FIG. 1 of the drawings, the continuous strip water sensor 10 shown continuously affixed as by the aforesaid adhesive to the bottom of the water pipe 14 and it will be understood that sections of plastic insulating film are applied to the inner surfaces of the pipe hangers where they cross the continuous strip water sensor 10 so that they will not short the conductors 12 and 13 which are exposed in the bottom most surface of the continuous strip water sensor 10 as hereinbefore described.

In FIG. 2 of the drawings, it will be seen that if there is a leak in the pipe 14, the water leaking will run down to the bottom of the pipe and over the continuous strip water sensor 10 where it will bridge the closely spaced parallel conductors 12 and 13.

By referring now to FIG. 5 of the drawings, a block diagrammatic circuit may be seen to which the conductors 12 and 13 are connected by terminal posts 18 and 19 respectively. The circuit of FIG. 5 of the drawings acts to originate an alarm upon the detection of water by the continuous strip water sensor 10 hereinbefore described.

In FIG. 5 of the drawings, a 24 volt AC source of current is shown in connection with a bridge rectifier 20 which is grounded as at 21. The bridge rectifier 20 is connected with a 24 volt regulator 22 and the connection is grounded as at 23 by way of a 500 μμF, 50 v DC capacitor 24. The current from the regulator 22 connects by way of a conductor 25 with the terminal post 18 and by way of a secondary 500 μμF, 50 v DC capacitor 26 with a conductor 27 which is connected with the terminal post 19 and with a transistor 28 by way of a 15KΩ resistor 29. One terminal of the transistor 28 is grounded as at 30 and another terminal thereof is connected with a 24 volt relay 31. The relay 31 operates to simultaneously make and break a pair of circuit switches 32 and 33 respectively which in turn are in connection with visual alarm devices 34 and 35 respectively.

In a remote location such as a television transmitter translator operated by remote controls from a principal transmitter site, the terminals 34 and 35 may supply a signal to a radio transmitter or the like capable of transmitting the signal to the principal transmitter site.

It will occur to those skilled in the art that the moisture sensing device for pipes and the like as disclosed herein may be used in connection with supervising piping systems other than water systems and wherein the fluid has electrical transmission properties capable of bridging the conductors 12 and 13 of the continuous strip water sensor 10 as heretofore described.

It will thus be seen that a simple, inexpensive easily installed moisture sensing device has been disclosed which incorporates a novel continuous sensor that is applied directly to a pipe to be supervised and that when said sensor is electrically connected with a suitable alarm initiating circuit such as disclosed herein, an efficient dependable and extremely sensitive moisture sensing device is realized.

Although but one embodiment of the present invention has been illustrated and described, it will be apparent to those skilled in the art that various changes and modifications may be made therein without departing from the spirit of the invention and having thus described my invention what I claim is:

1. A device capable of detecting an extremely small drop of liquid associated with a leak from a pipe or the like comprising an alarm means, an elongated strip of insulating material having inner and outer faces, spaced longitudinally extending electrical conductors partially embedded in said strip, continuous portions of each of said conductors exposed on said outer face of said strip, said conductors being closely spaced to one another with a maximum spacing of about 3/64th of an inch therebetween so that extremely small particles of liquid can be detected, means on the inner face of said strip for mounting said strip to said pipe or the like, said electrical conductors connected with said alarm means, said alarm means arranged to initiate an alarm upon moisture bridging said electrical conductors.

2. The device of claim 1 and wherein said elongated strip is flexible dielectric material, the inner and outer faces thereof being substantially transversely flat.

3. The device of claim 1 and wherein said elongated strip is a continuous section of insulated two conductor electric wire with the insulation material thereof arranged to expose parallel longitudinal portions of said conductors.

4. The device of claim 1 and wherein said conductors are cross sectionally small, closely spaced with respect to one another and the strip of insulating material is about 1/32 of an inch thick and less than ⅜ of an inch in width.

* * * * *